United States Patent
Leone et al.

(10) Patent No.: US 7,474,355 B2
(45) Date of Patent: Jan. 6, 2009

(54) CHROMA UPSAMPLING METHOD AND APPARATUS THEREFOR

(75) Inventors: Pasquale Leone, Toronto (CA); Wing-Chi Chow, Toronto (CA); Aharon Gill, Haifa (IL)

(73) Assignee: Zoran Corporation, Sunnyvale, CA (US)

( * ) Notice: Subject to any disclaimer, the term of this patent is extended or adjusted under 35 U.S.C. 154(b) by 1014 days.

(21) Appl. No.: 10/636,462

(22) Filed: Aug. 6, 2003

(65) Prior Publication Data

US 2005/0030422 A1    Feb. 10, 2005

(51) Int. Cl.
    *H04N 11/02*   (2006.01)
(52) U.S. Cl. ............... 348/453; 348/441; 348/450; 348/708
(58) Field of Classification Search ........... 348/453, 348/441, 708, 450, 452, 630, 443–444, 446, 348/448–449, 554–558, 455–456
    See application file for complete search history.

(56) References Cited

U.S. PATENT DOCUMENTS

| | | | |
|---|---|---|---|
| 5,650,824 A | 7/1997 | Huang | |
| 5,684,544 A | 11/1997 | Astle | |
| 5,712,687 A * | 1/1998 | Naveen et al. | 348/453 |
| 6,133,960 A * | 10/2000 | Mendenhall | 348/561 |
| 6,208,350 B1 | 3/2001 | Herrera | |
| 6,297,801 B1 | 10/2001 | Jiang | |
| 6,538,658 B1 | 3/2003 | Herrera | |
| 7,006,147 B2 * | 2/2006 | Willis | 348/448 |
| 7,136,417 B2 * | 11/2006 | Rodriguez | 375/240.29 |

OTHER PUBLICATIONS

Munsil et al., The Chroma Upsampling Error and the 4:2:0 Interlaced Chroma Problem, Apr. 2001, www.hometheaterhifi.com, pp. 1-20.

* cited by examiner

*Primary Examiner*—Trang U Tran
(74) *Attorney, Agent, or Firm*—Davis Wright Tremaine LLP

(57) ABSTRACT

A unique method for chroma vertical upsampling used, for example, for conversion of the "4:2:0" format chroma information used in many applications of digital video, to the "4:2:2" or "4:4:4" format, is presented. This conversion is required so that video encoders can effect the display of this chroma information with a minimum of visible artifacts. The present invention carries out chroma vertical upsampling on a pixel by pixel basis. This chroma vertical upsampling is performed as a function of the amount of motion associated with each pixel as detected between 2 or more fields, and the field, frame and progressive sequence characteristics of the incoming video signal data.

21 Claims, 11 Drawing Sheets

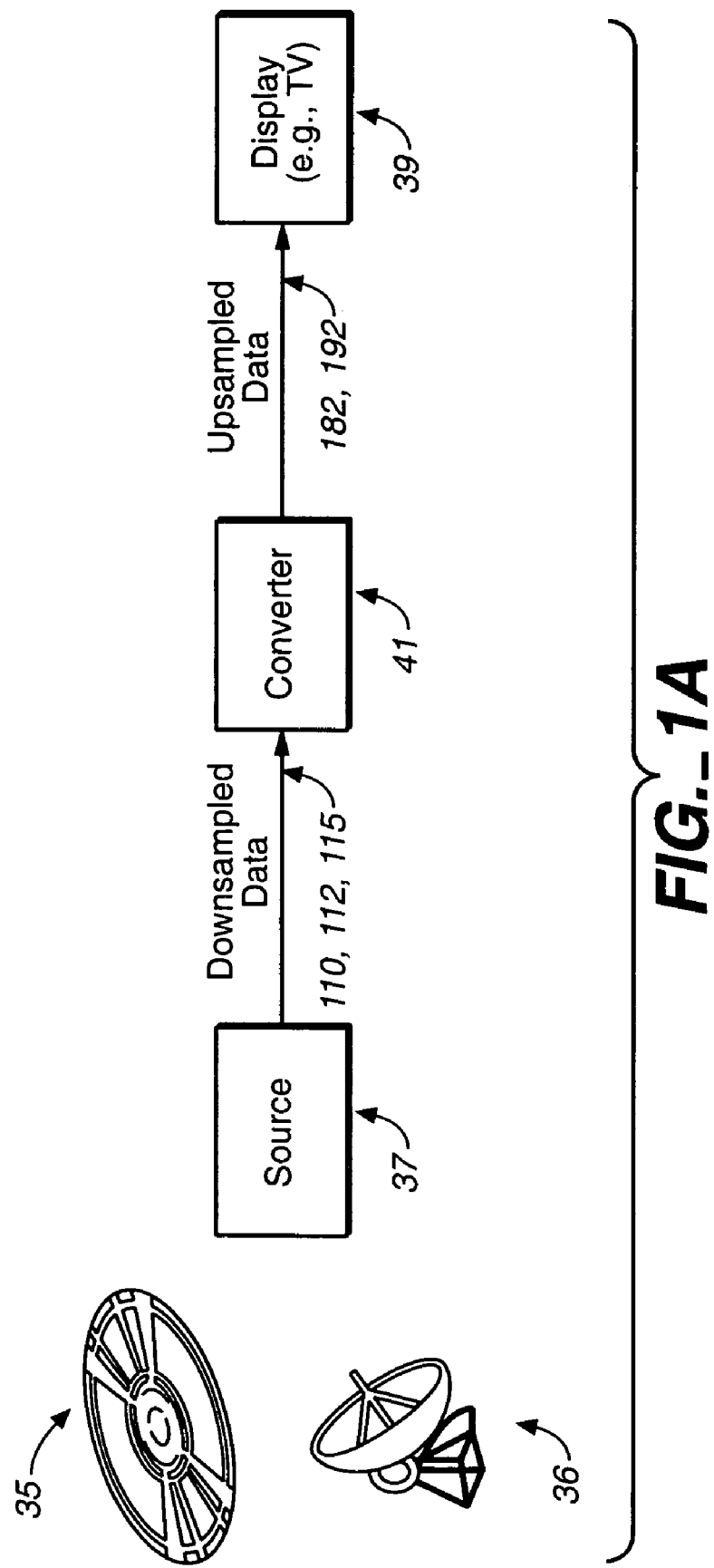
FIG._1A

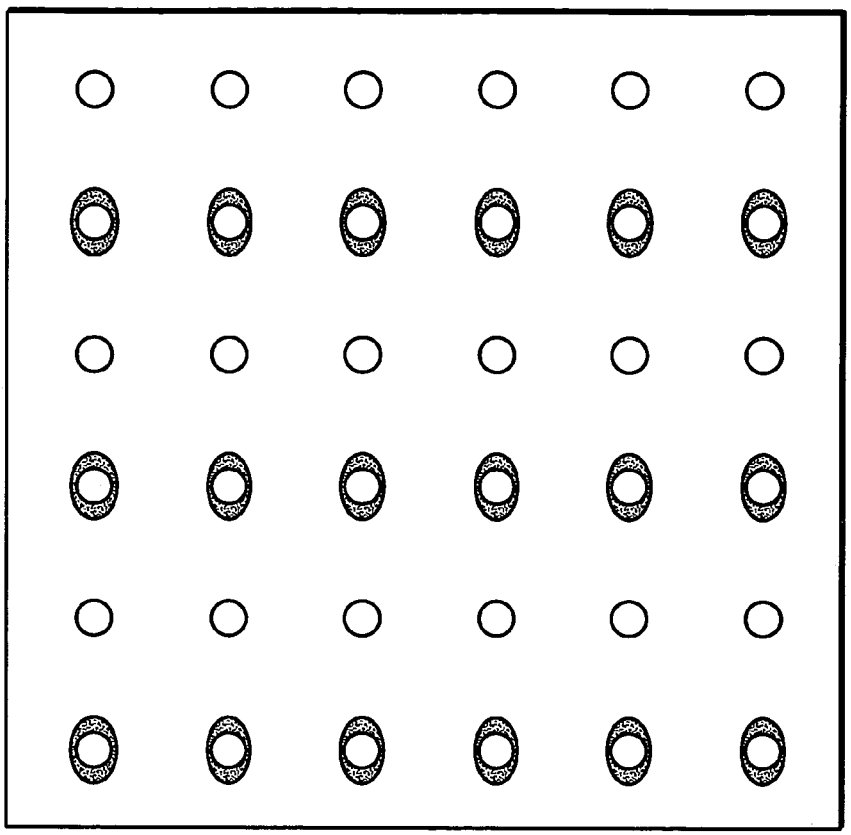
FIG._3
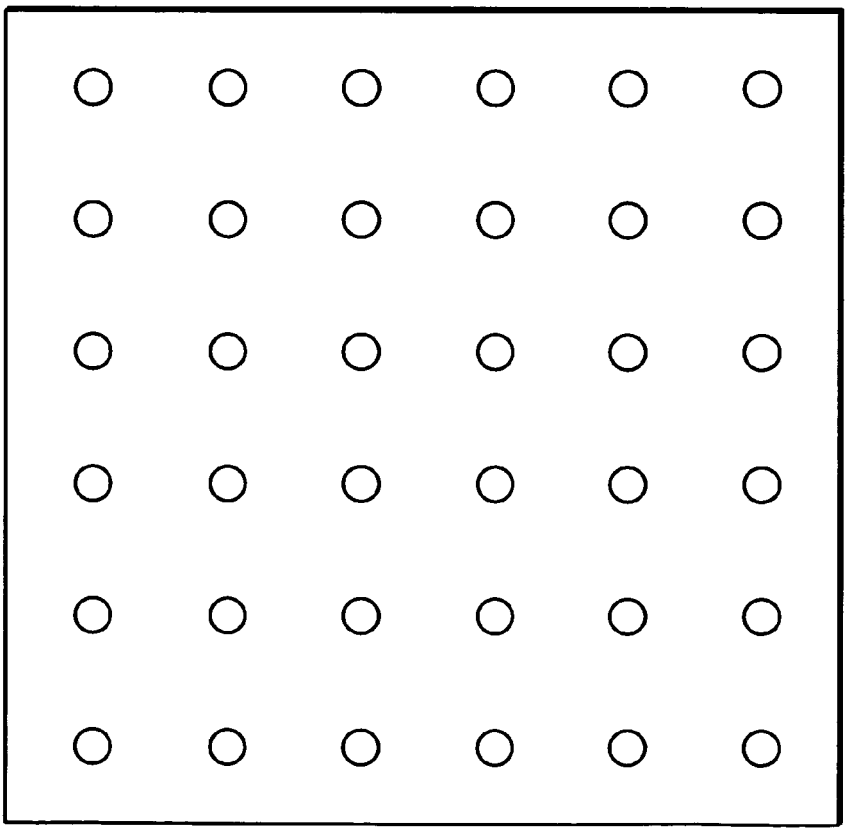
FIG._2

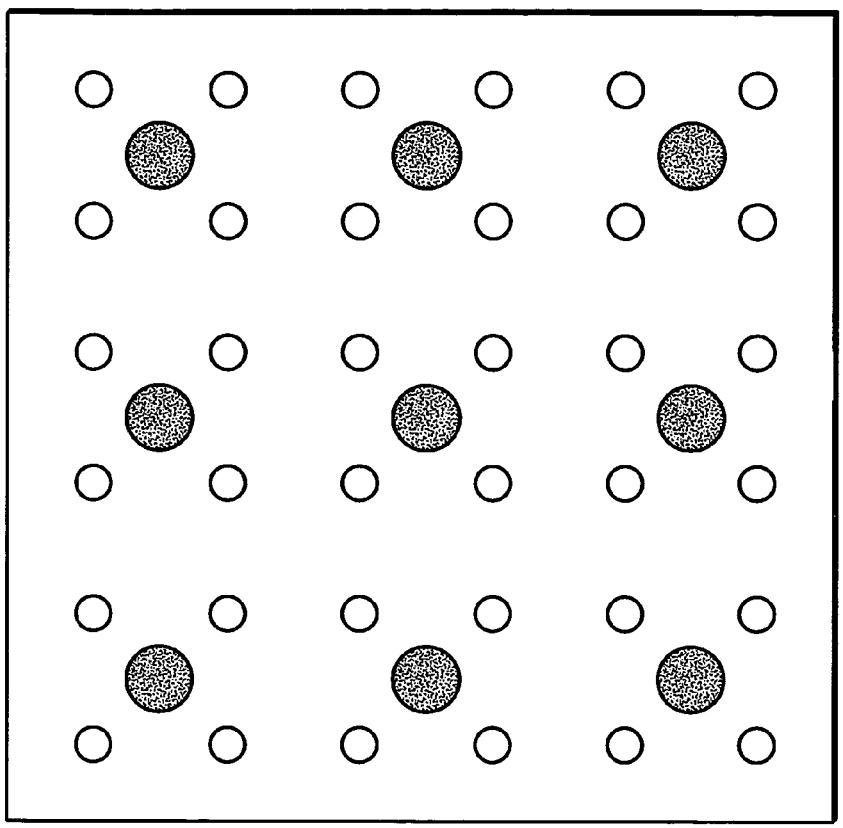
FIG._4B
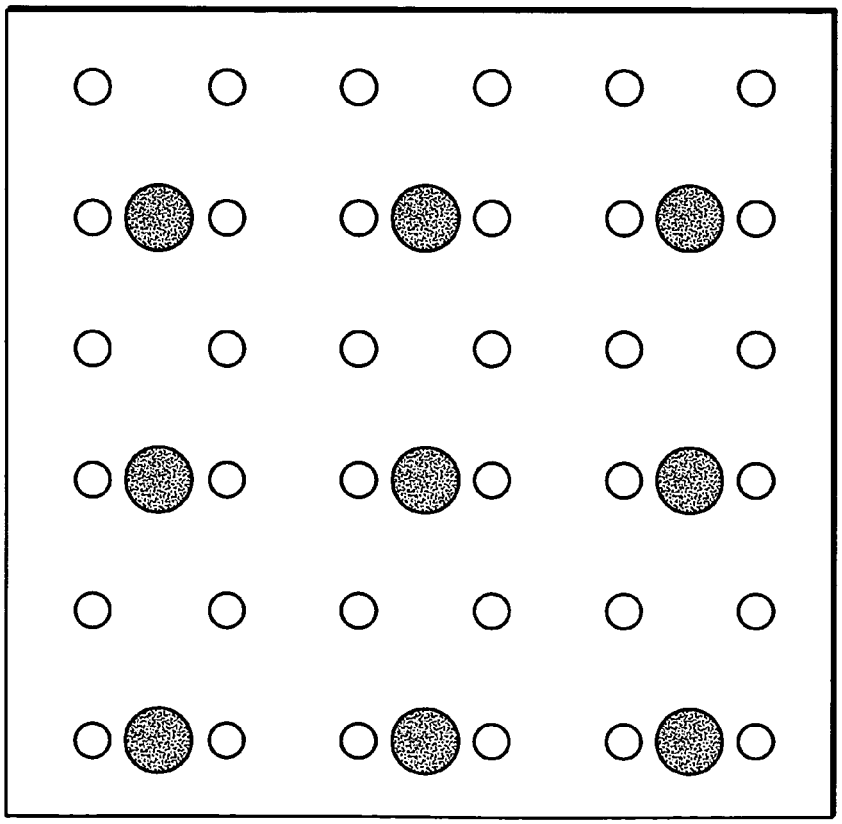
FIG._4A

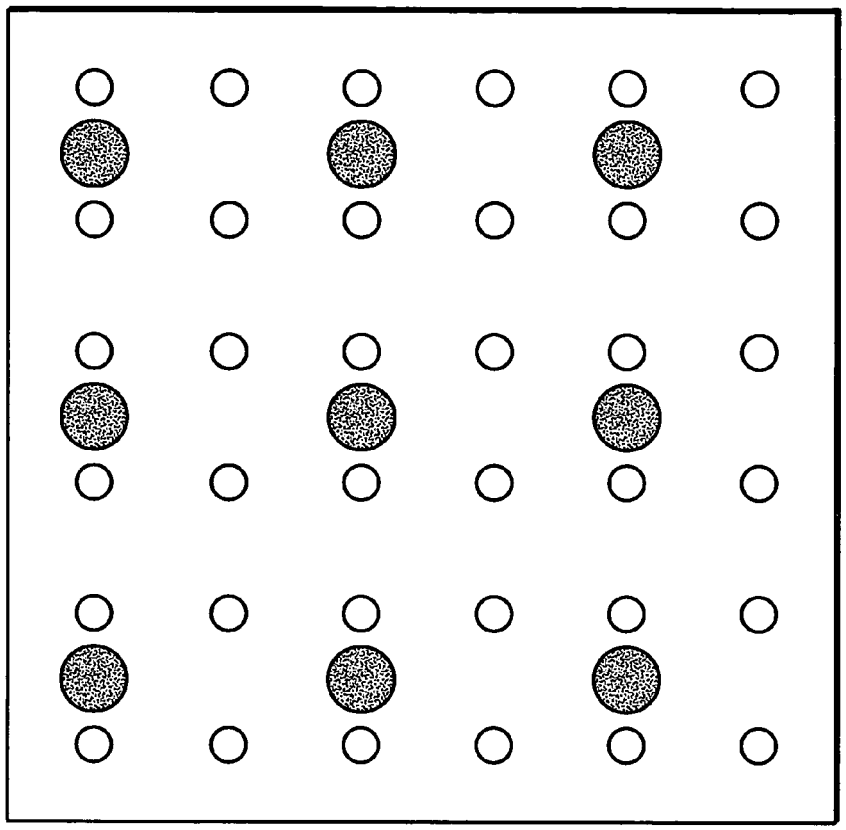
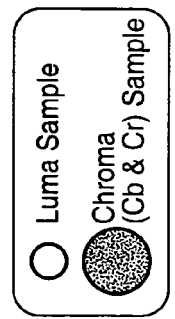
*FIG._5B*
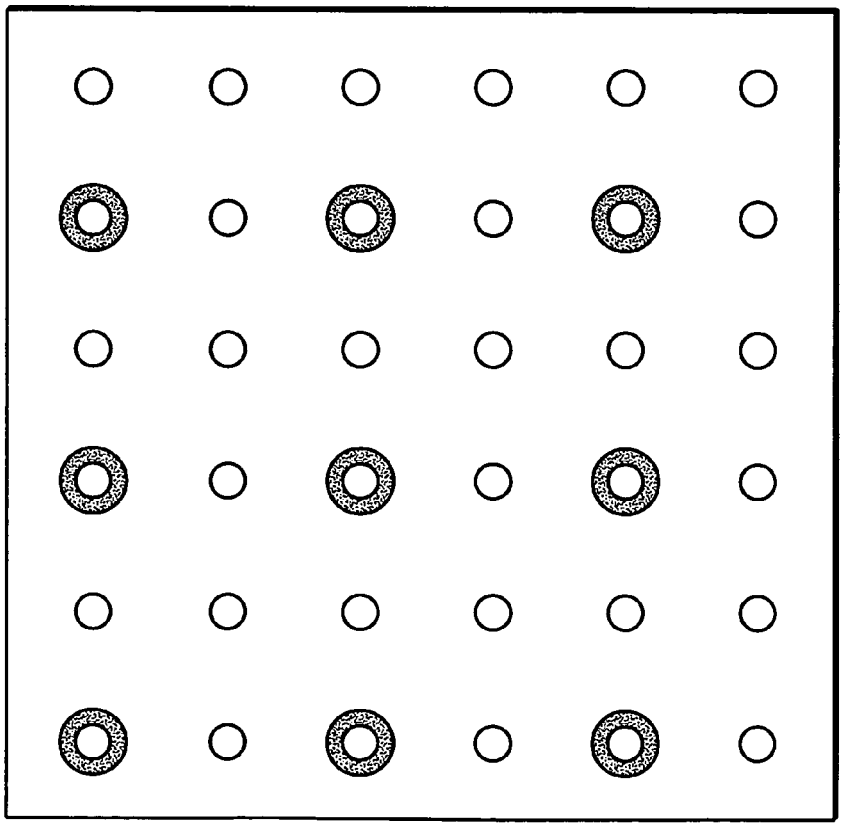
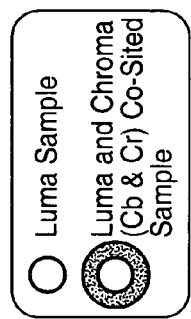
*FIG._5A*

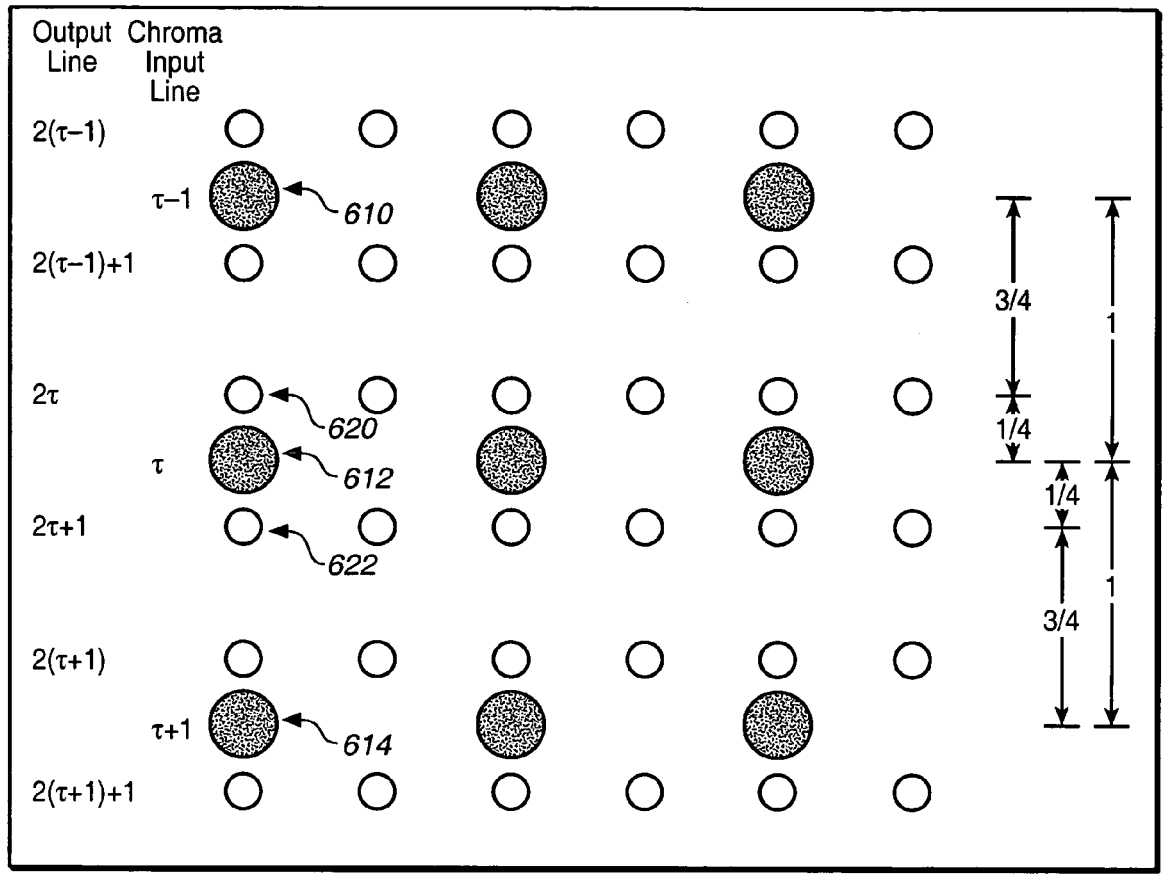
FIG._6A

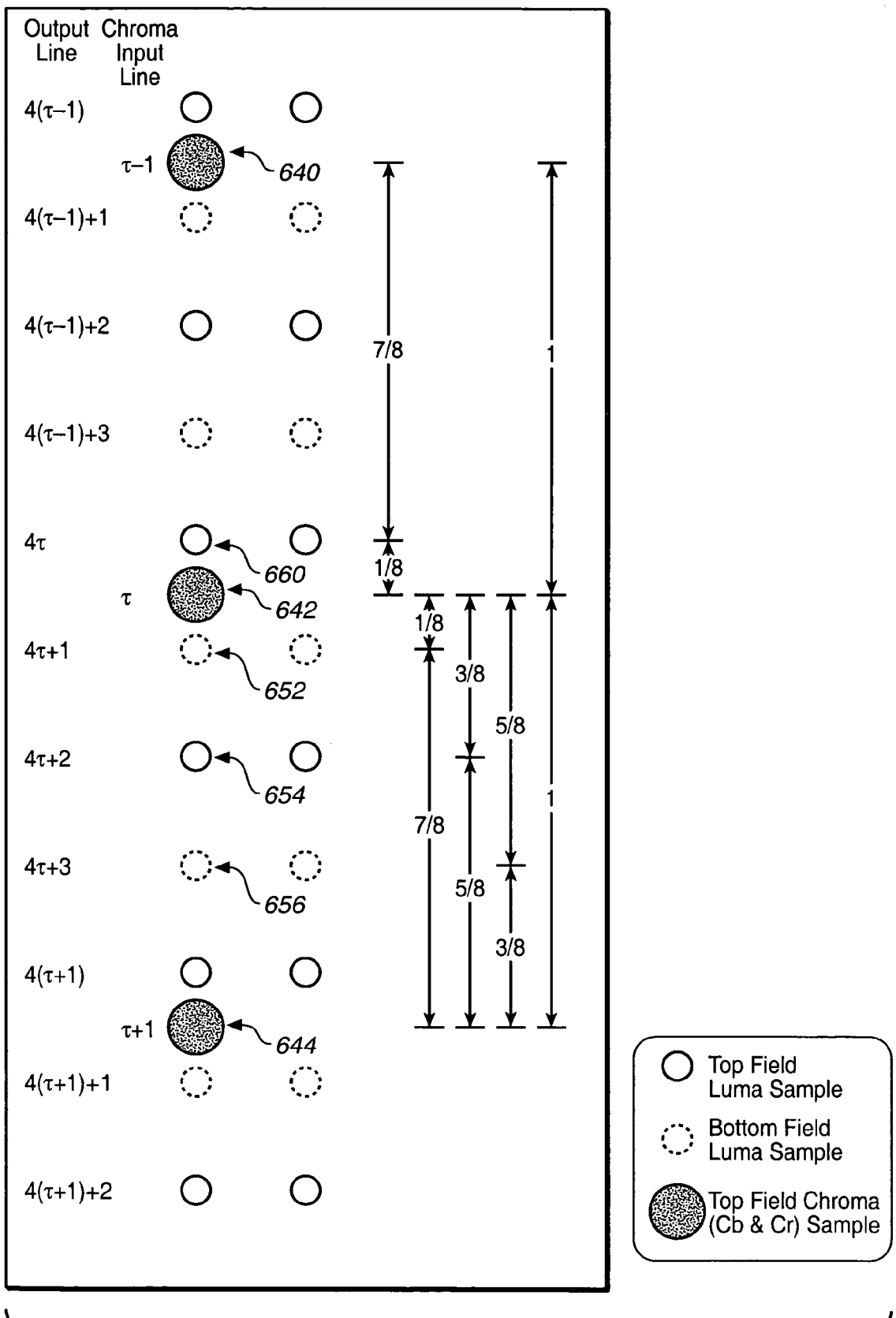
FIG._6B

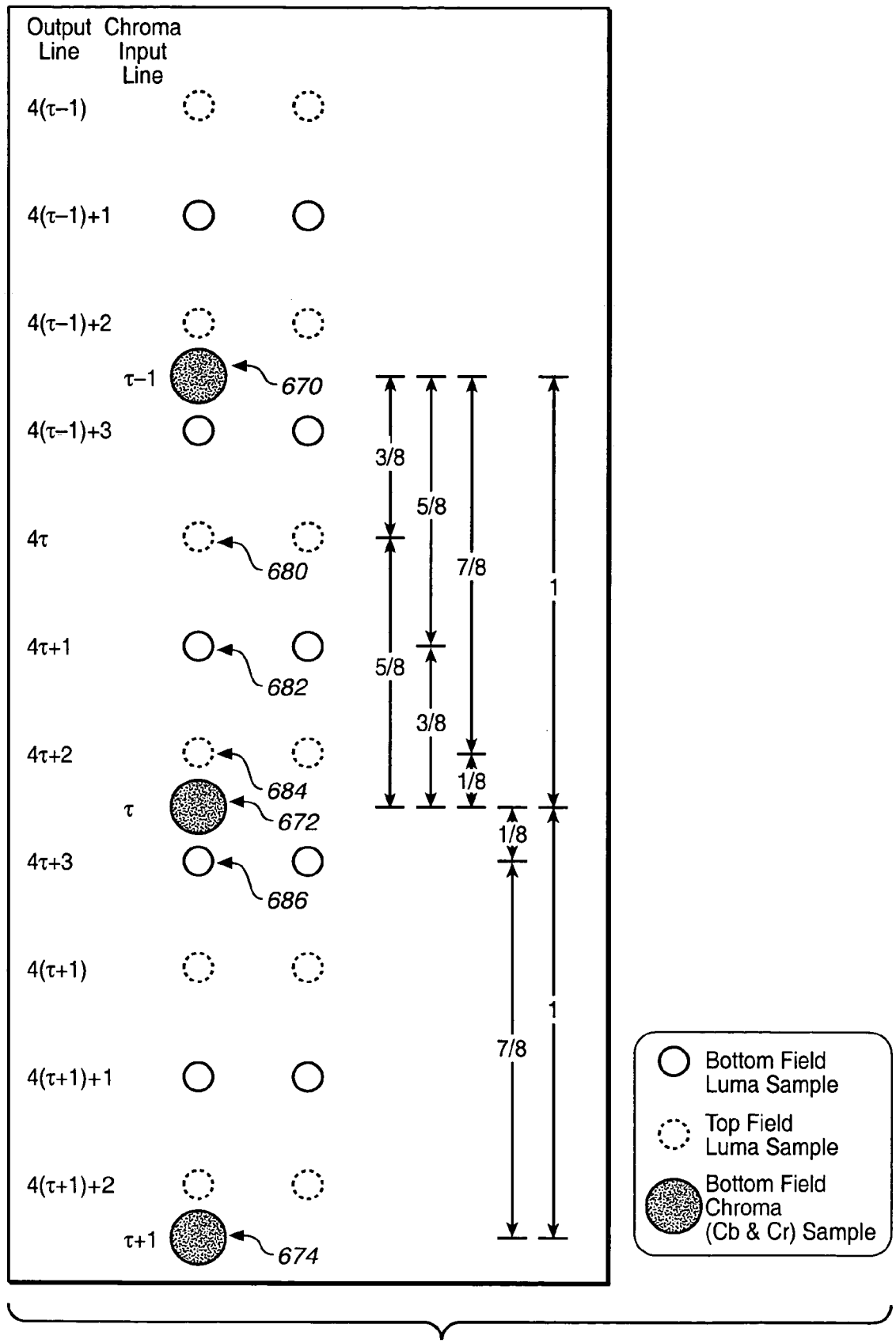
FIG._6C

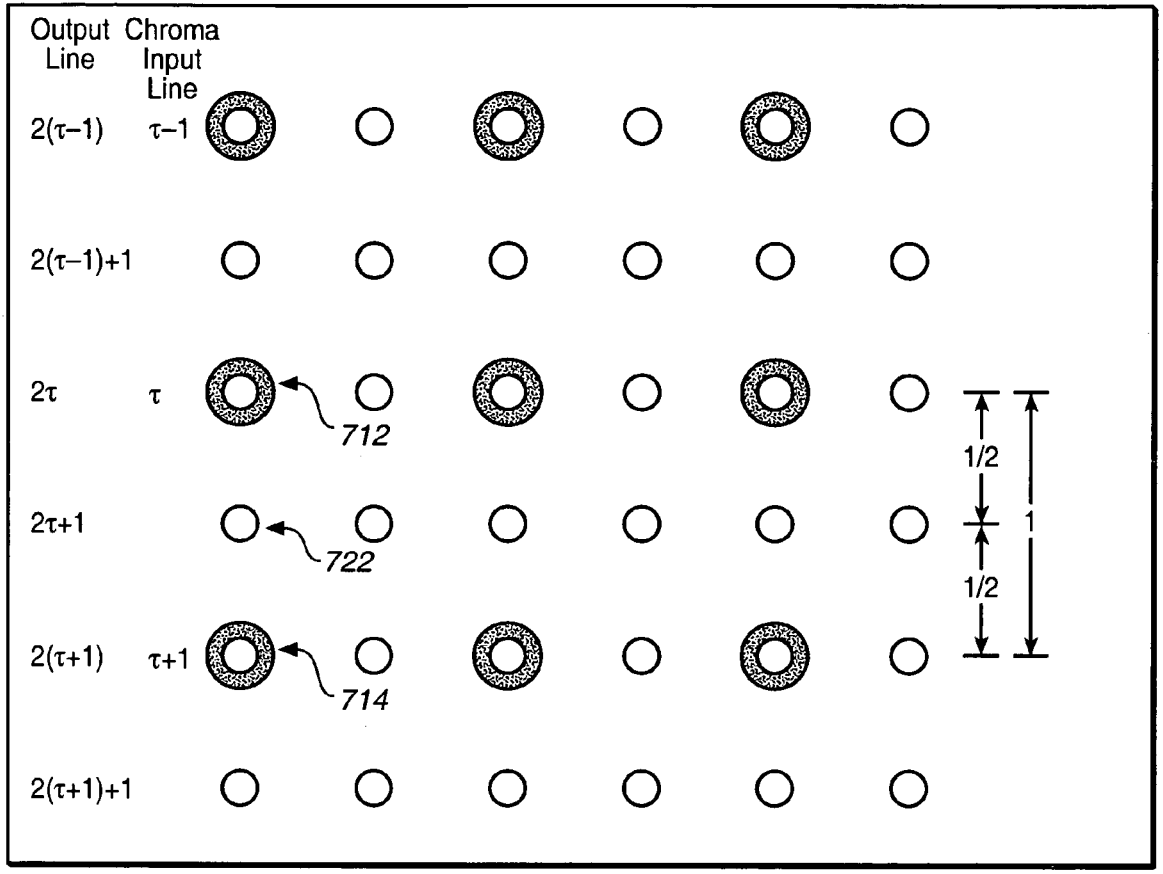
FIG._7A

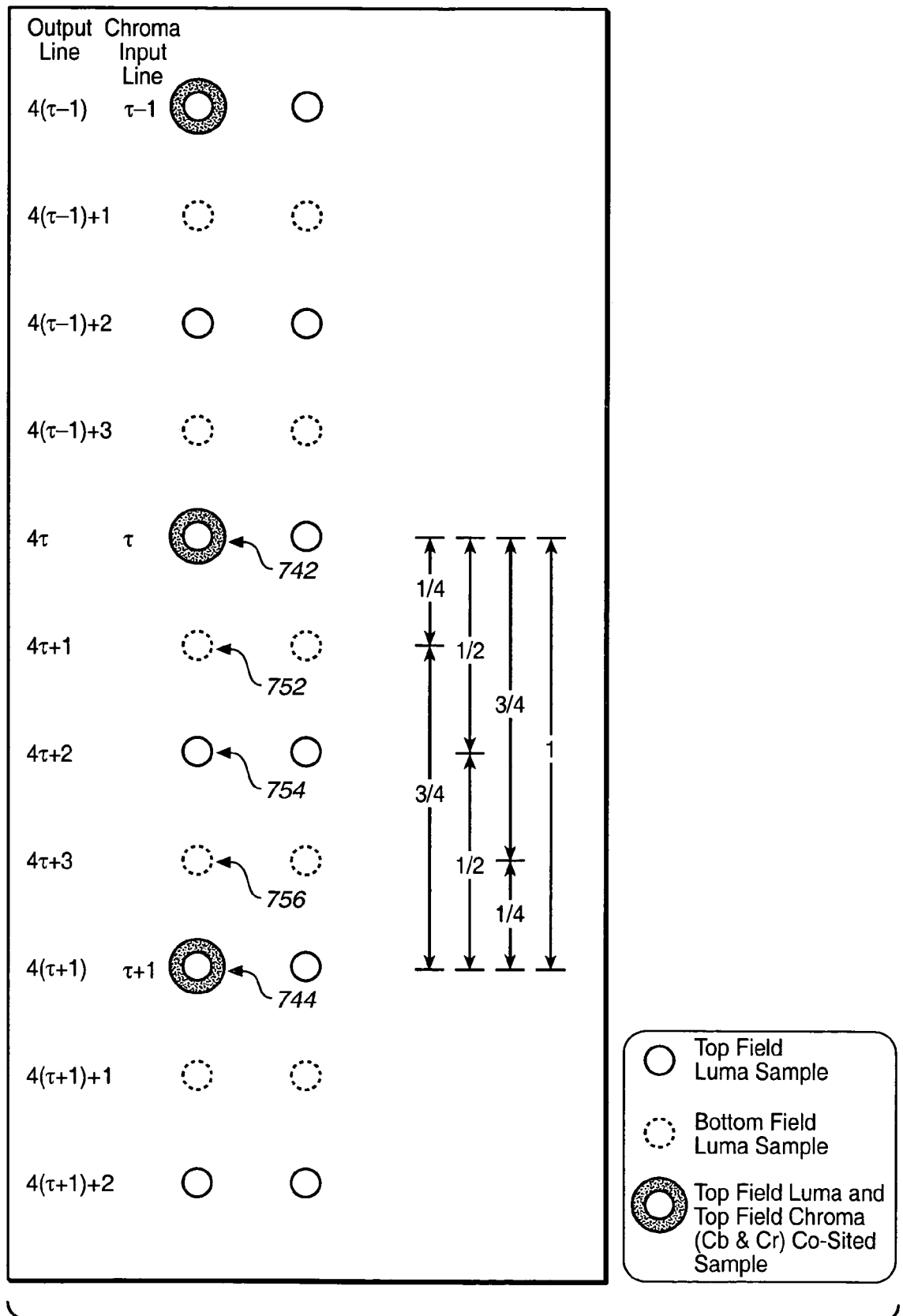
FIG._7B

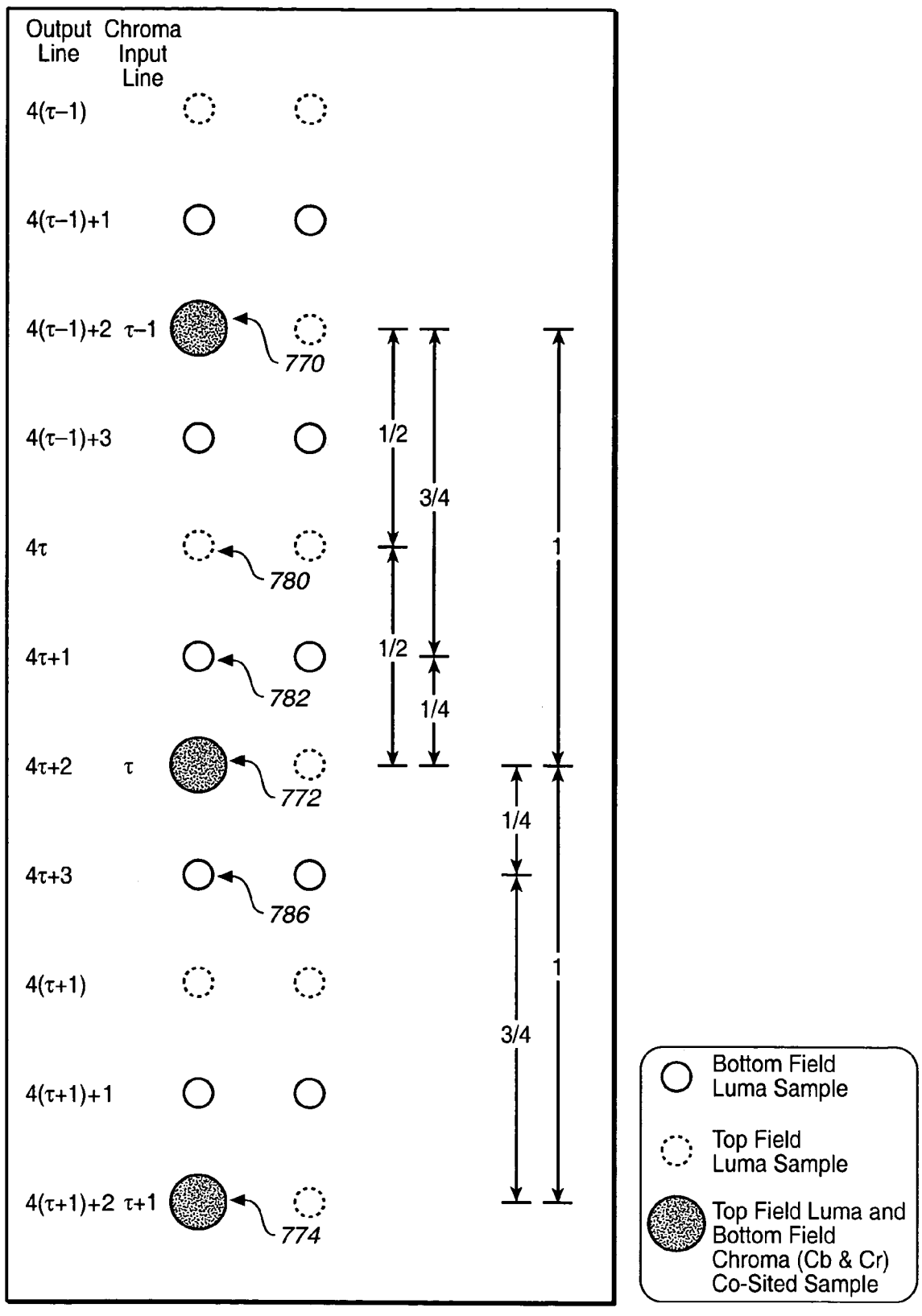
FIG._7C

CHROMA UPSAMPLING METHOD AND APPARATUS THEREFOR

BACKGROUND OF THE INVENTION

This invention relates, generally, to the processing of video data and, more specifically, to the elimination of picture processing artifacts visible on images displayed from data with vertically sub-sampled chroma.

A thorough background article on chroma upsampling error entitled "DVD Benchmark—A Special Report—The Chroma Upsampling Error on DVD Players—April 2001 by Don Munsil and Stacey Spears", was published by "hometheaterhifi.com" in April 2001, since updated, and is hereby incorporated by reference.

The method was invented to address a problem of the quality of displayed MPEG compressed images which can be found in nearly every DVD player currently being offered for sale. Many MPEG compression based satellite or cable television receivers also display this difficulty. The effect is seen as jagged edges on brightly colored objects that appear in the display of the decoded image. The problem stems from the improper conversion of the "4:2:0" chroma format (where each of the two chroma components have half the number of samples per line and half the number of lines as the luma component), used for example by the more popular subsets of the MPEG video standards, to the "4:2:2" chroma format (where each of the two chroma components have half the number of samples per line and the same number of lines as the luma component) or "4:4:4" chroma format (where each of the two chroma components have the same number of samples per line and the same number of lines as the luma component) required in order to create an image suitable for viewing on standard interlaced or progressive scan television displays. Although methods are known in the prior art that, to some degree, alleviate the artifacts caused by this problem, a complete solution has not been available in the past.

In the following, "luma" or "luminance," is called "Y". Depending on the color system, the two "chroma" or "chrominance" signals may be labeled "U" and "V," "I" and "Q," "Pb" and "Pr," or "Cb" and "Cr" (which will be used in the following). These are slightly different image signal encoding formats, but they are all essentially the same in concept. In the MPEG video compression process used in the DVD system, the Y component is compressed at full resolution. The Cb and Cr color signal components are compressed at a lower resolution, both horizontally and vertically. When a video image is first captured for eventual distribution on DVD, it is usually captured using the same luma and chroma resolution format, called "4:4:4", which means that for every luma sample there is one sample of Cb and one sample of Cr. In other words, the color signal contains chroma information relating to each of the luma samples. The 4:4:4 full resolution chroma format is generally only used internally within a device to avoid degradation during processing.

When video program content is recorded to a master tape to be used as a DVD video source, it is usually reduced to the 4:2:2 format, a lower resolution chroma format. In the "4:2:2".format, every two luma horizontally adjacent samples are associated with one sample of Cb and one sample of Cr. A yet lower resolution chroma format, and the one standard for DVD, is "4:2:0". For the "4:2:0" format, there are half as many samples of Cb and Cr on each scan line, and half as many scan lines of Cb and Cr as compared to Y. In other words, the resolution for chroma is half that of luma in both the horizontal and vertical directions. For example, if a color image of 720×480 image samples ("pixels") is encoded in the "4:2:0" format, the chroma information for this image would be represented by 360×240 Cb samples and 360×240 Cr samples. In order to display an image originating in the "4:2:0" format, the missing chroma samples need to be interpolated on each scan line from the chroma samples on either side of each missing chroma sample, and entire scan lines of chroma information need to be interpolated from the chroma scan lines above and below each missing chroma scan line. This process is called chroma upsampling. Care must be taken to properly upsample the "4:2:0" format in order to avoid chroma errors.

Movie images such as stored on DVD, are, for the most part, displayed in one of two ways, either in a progressive manner or an interlaced manner. If the images are displayed progressively, each line of image data drawn on the display screen is preceded and followed by an adjacent line of image data. If the image is displayed in an interlaced manner, half of the lines that comprise a full set of image data are displayed first, followed by the other half of the image data lines. This second half of image date lines are drawn between the first half of image data lines. If all the lines of an image are drawn during one pass from the top of the image to the bottom of the image, as is the case for a progressively scanned image, this single scanning pass is called a frame. If only half of the lines are displayed first, as is the case for an interlaced image, this single scanning pass is called a field. In this latter case, two fields would equal a frame. These two fields are known as the odd field and the even field, the top field and the bottom field, or field 1 and field 2.

The movie images, such as stored on DVD, can be obtained from an interlaced video source, such as a television camera, or from motion picture film or a computer generated image, which serve as a progressive video source. In either case, DVD images may be stored in full frames, or in separate fields. If the original source was interlaced, the MPEG encoder that writes the DVD may take pairs of fields, weave them together into full frames, compress the frames and store those compressed frames on the DVD disc. More detail on the interlaced to progressive conversion are given in copending U.S. patent applications Ser. No. 10/033,219, filed Dec. 27, 2001, entitled "Techniques For Determining the Slope of a Field Pixel", and Ser. No. 10/119,999, filed Apr. 9, 2002, entitled "2:2 and 3:2 Pull-Down Detection Techniques", both of which are commonly assigned with the present application and are hereby incorporated by reference. If the original source was progressive, the original frames may be compressed and written to disc, or may be separated into two fields, to be compressed separately and stored. For compressed progressive frames, the MPEG encoder sets the "progressive_frame" flag to "True". During DVD playback, if the original video was interlaced, then it is important that the chroma information for one field not leak into the other field. To do this, the MPEG decoder needs to split compressed frames into two fields, and then upsample the "4:2:0" format chroma data to the "4:2:2" format separately for each field. If, however, the frame was originally progressive, then the chroma information needs to be upsampled to "4:2:2" across the whole frame, then split again into fields, if it is to be displayed on an interlaced scanned television receiver.

Note that (e.g. for MPEG) the chroma lines are visualized as being located between the luma lines. This is because the missing lines of chroma samples in the "4:2:0" encoding format are averaged from the chroma information carried on the original scan lines which are above and below the missing scan lines. For a progressively scanned 4:2:0 MPEG encoded image, the first line of chroma samples is created by averaging lines 0 and 1 from the original image, and the second line is created from image lines 2 and 3, and so forth.

When two consecutive interlaced 4:2:0 fields are compressed and stored together as a single MPEG encoded frame, the chroma values are still located between the scan lines, but there's an important difference. The first line of chroma values is averaged not from lines 0 and 1, but from lines 0 and 2, and assuming that the MPEG encoder is properly designed, these values should be averaged using 75% line 0 and 25% line 2. This is because the derived line is defined to be physically closer to line 0 than line 2. Thus, the first "virtual line" of chroma values is still between image lines 0 and 1. But line 1 is not used for field 0; it is part of field 1. So the chroma information is averaged from lines 0 and 2. The "virtual line" of chroma is 0.5 lines away from line 0, and 1.5 lines away from line 2. So line 0, being 3 times closer, should affect the derived chroma sample three times as much as line 2. However, some MPEG encoders, in order to reduce complexity and cost, perform a simple 50/50 average of lines 0 and 2, or use line 0, and throw away line 2. Note, though, that picture line 1 is not involved in encoding the first chroma line at all. Line 1 is the first line of the next field, and color from field 1 must be prevented from bleeding into field 0. This is because there may be movement between the two fields, resulting in the display of very noticeable color artifacts. In the next field, field 1, the second chroma line affects picture lines 1 and 3, but again, the chroma sample is closer to line 3 than line 1, so the sample should be calculated as 75% line 3's chroma and 25% line 1's chroma. More sophisticated algorithms than a simple 75%/25% average, using more than 1 data points, are sometimes employed by MPEG encoders. However it needs to be pointed out that although chroma information should not be calculated from a simple 50%/50% average, many of the MPEG encoders used today follow this approach.

To view an image in 4:2:0 format on an output display device, it is necessary to convert it back to 4:2:2 or 4:4:4 format so that it is compatible with the video encoder which converts the digital signals to an analog format accepted by such a display device. It is not very important whether the output device converts the 4:2:0 information to 4:2:2 or 4:4:4; many video encoders can accept either format, but it must be one of these formats. In order for the video encoder to perform this conversion, it needs to simultaneously be provided with a line of chroma for every line of luma, because it is converting the digital video to analog video in real time. The display cannot "remember" what the chroma information was for the previous scan line, so it cannot interpolate missing lines of chroma information. Only 4:2:2 and 4:4:4 have a 1:1 ratio of chroma and luma scan lines, so the MPEG decoder needs to output one or the other.

The MPEG pictures are stored in the same format whether they represent a progressive frame or two interlaced fields woven together. A "progressive_frame" flag is set to tell the decoder whether the chroma information should be interpolated across the whole picture, or separated into fields and interpolated separately for each one. Unfortunately, most prior art MPEG decoders ignore the "progressive_frame" flag, and only perform one kind of interpolation in order to make an MPEG integrated circuit chip simpler and thereby reduce cost. Also, there are often errors with the MPEG flags. It is not uncommon for the "progressive_frame" flag to not be set when it should be set; and it is not uncommon for the "progressive_frame" flag to be set when it should not be set. MPEG decoders that use only one algorithm tend to use the interlaced algorithm, most likely because it's possible to implement it with less buffer memory, as only one field at a time must be upsampled. When the interlaced algorithm is applied to progressive images, chroma samples that were supposed to be used for scan lines 1 and 2 are instead interpolated to scan lines 1 and 3, and the chroma samples for scan lines 3 and 4 instead are affecting 2 and 4. In the simplest case, where the chroma lines are just copied to the adjacent image lines, the end result is that scan line 2 gets the chroma information for scan line 3, and vice versa, all the way down the screen. Effectively, adjacent pairs of chroma scan lines are switched, which produces the characteristic jagged/streaky visual effect known as the chroma upsampling error.

The chroma upsampling error does not look the same on all DVD players because the chroma sample interpolation scheme varies from player to player. As previously stated, in the simplest case, data from the 4:2:0 samples are copied twice to create the 4:2:2 data. A player using this approach displays chroma data that tends to look blocky with accentuated jaggedness. Other players employing more sophisticated interpolation schemes, such as bilinear filtering, or $sin(x)/x$ filtering which smoothes the chroma channel to some degree, can make the upsampling error less visible, but not completely hidden, especially when there is a sharp edge in the image. Such a system is described in U.S. Pat. No. 5,650,824, "Method For MPEG-2 4:2:2 and 4:2:0 Chroma Format Conversion", Si Jun Huang inventor, which is hereby incorporated by reference. The method described in this patent receives incoming video signals and separates them according to whether they are in progressive or interlaced format and then, for interlaced format, into even and odd fields. For each of these cases, a fixed but different filter is used based on these constructs, independent of both the characteristics of the particular frame or field or the frame to frame or field to field variations. In this case, the jaggedness and streaks will have a smoother appearance, but the interpolation may create additional "color bleeding" artifacts and be very visible to an experienced viewer.

To help solve the color-bleeding problem, another approach is offered by U.S. Pat. No. 6,297,801, Edge Adaptive Chroma Up-Conversion, Hong Jiang inventor, which is hereby incorporate by reference. Unlike the other prior art methods of chroma upsampling previously discussed, which use replication or linear interpolation of chroma values to effect chroma up-sampling, this technique relies on intra-field luma information in the locations surrounding a chroma sample location to effect chroma up-sampling. This is essentially a horizontal upsampling technique and assumes a correlation between luma and chroma components and uses neighboring luma components to calculate missing chroma values. When a strong edge exists in the luma image at a particular location, the chroma components at this location are assumed to also have edges. Thus, instead of using linear interpolation with a weighting factor as a function of spatial distance, the weighting factor is adjusted according to the variation in the luma values. Although this approach may help prevent color bleeding at sharp image transitions, when progressively scanned images using lower resolution chroma formats are upsampled to higher resolution chroma formats, it adds significant complexity when interlaced images are being processed. For interlaced video formats, the separation of adjacent rows in the video data increases, requiring much larger data storage if this technique is to be used. In addition, the methods of U.S. Pat. No. 6,297,801 require the use of a frame buffering format which stores vertically adjacent rows near each other, or a technique that allows rapid access of non-contiguous data, in order to be adapted to interlaced images. Therefore, from a practical standpoint, it does not help reduce the chroma upsampling error.

SUMMARY OF THE INVENTION

Therefore, the present invention, briefly and generally, provides methods and apparatus to prevent the chroma upsampling error described in the Background section. Accordingly, when fields of video data containing a downsampled component are received, the amount of field to field variation in the frames is determined. Based upon this motion value, a weighted sum of a progressive upsampling and an interlaced upsampling is formed for the downsampled component, where the relative weights are a function of motion value.

An exemplary embodiment of the present invention provides methods and apparatus for upsampling chroma from the "4:2:0" to "4:2:2" format on a pixel by pixel basis in response to the detection of image motion between two or more video fields. If no motion is detected, then a progressive chroma upsampling method is used. If some motion is detected, then a combination of the progressive and interlaced chroma upsampling methods is used and if much motion is detected, then an interlaced chroma upsampling method is used. If the present invention performs chroma upsampling as part of the process to convert an interlaced image to a progressively scanned image, the deinterlacing and chroma upsampling are performed using the same motion information. The input to the deinterlacer is in the 4:2:0 chroma format while the output from the deinterlacer is in the 4:2:2 or 4:4:4 chroma format. After the deinterlacing process is complete, the image is converted to either an interlaced scanned format, such as the 480i interlaced format, or left in the progressively scanned format, such as the 480p progressive format.

Additional details, features and advantages of the present invention will become apparent from the following description, which should be taken in conjunction with the accompanying drawings.

BRIEF DESCRIPTION OF THE DRAWINGS

For a more complete understanding of the present invention and for further embodiments, aspects, and advantages, reference is now made to the following descriptions taken in conjunction with the accompanying drawings in which:

FIG. 1A is a block diagram of the context in which the described upsampling process may be used;

FIG. 2 is a diagram depicting 4:4:4 YCbCr video sampling;

FIG. 3 is a diagram depicting 4:2:2 YCbCr video sampling;

FIG. 4A is a diagram depicting type-1 4:2:0 YCbCr video sampling typically used in MPEG2;

FIG. 4B is a diagram depicting type-2 4:2:0 YCbCr video sampling typically used in MPEG1;

FIG. 5A is a diagram depicting type-3 4:2:0 YCbCr video sampling typically used in JPEG 2000;

FIG. 5B is a diagram depicting type-4 4:2:0 YCbCr video sampling;

FIG. 6A is a diagram depicting type-1 progressive 4:2:0 to 4:2:2 chroma upsampling;

FIG. 6B is a diagram depicting type-1 top-field interlaced 4:2:0 to 4:2:2 chroma upsampling;

FIG. 6C is a diagram depicting type-1 bottom-field interlaced 4:2:0 to 4:2:2 chroma upsampling;

FIG. 7A is a diagram depicting type-3 progressive 4:2:0 to 4:2:2 chroma upsampling;

FIG. 7B is a diagram depicting type-3 top-field interlaced 4:2:0 to 4:2:2 chroma upsampling; and FIG. 7C is a diagram depicting type-3 bottom-field interlaced 4:2:0 to 4:2:2 chroma upsampling.

DESCRIPTION OF SPECIFIC EMBODIMENTS

Figure 1B:
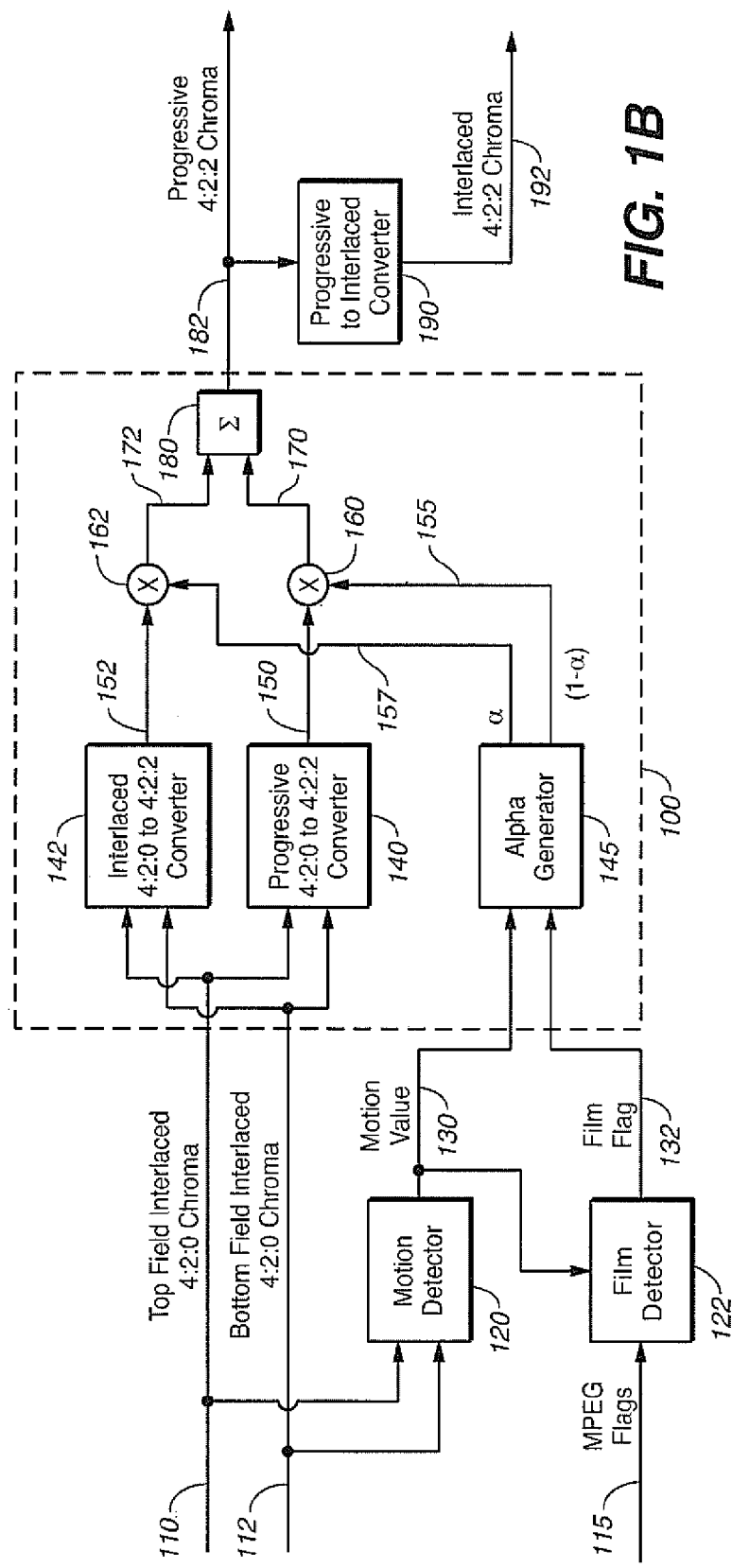
FIG. 1B is a block diagram of the 4:2:0 to 4:2:2 chroma upsampling process.

Certain embodiments of the present invention and their advantages are best understood by referring to the drawings. Like reference numerals are used for like and corresponding parts of the various drawings.

In a principle aspect, the present invention presents chroma upsampling methods and apparatus that minimizes the picture processing artifacts described in the Background section and provide a solution that can be readily integrated for example into a single chip DVD processor integrated circuit. An exemplary embodiment performs chroma vertical upsampling for conversion of the "4:2:0" format chroma information used in many applications of digital video, to the "4:2:2" or "4:4:4" format. This conversion is required so that video encoders can effect the display of this chroma information with a minimum of visible artifacts. The present invention carries out such upsampling on a pixel by pixel basis. This chroma vertical upsampling is performed as a function of the amount of motion associated with each pixel as detected between 2 or more fields, and the field, frame and progressive sequence characteristics of the incoming video signal data.

FIG. 1A is a block diagram of a context in which the present invention could be advantageously employed. A downsampled signal is provided from source 37 along lines 110, 112, and 115. The signal source may be a DVD player, satellite or cable receiver, or other source. The source signal is typically downsampled to save space on the storage medium, such as DVD 35, or to save on bandwidth requirements, such as satellite transmission. For video data, as perception of color is less acute, it is generally the color, or chroma, components of a signal in luma-chroma format that is downsampled. In the exemplary embodiment, the source signal is taken in the 4:2:0 format described above. The video data needs to be upsampled to the format required by the television or other display device 39 on which the video will be watched. This upsampled signal is supplied along lines 182 and 192 in the 4:2:2 or 4:4:4 format in the exemplary embodiment.

The conversion of the video data from the downsampled form in which it is received into the appropriately upsampled form occurs in converter 41. In the exemplary embodiment, the converter 41 will be taken as part of a DVD player along with the DVD drive 37. In this case, the output of the DVD player including converter 41 will be the upsampled signals 182 and 192. More generally, the converter 41 may also be incorporated into the display 39, allowing it to receive input in downsampled form, or may be a separate unit, allowing the advantages of the present invention to be utilized with existing prior art systems.

The current invention can be applied to all video sampling methods which involve vertical sub-sampling. For example, the current invention can be applied to video samples with chroma sub-sampled by 4 vertically. The present invention will first be described with respect to an exemplary embodiment of converter 41, followed by a discussion of alternate embodiments. If the present invention performs chroma upsampling as part of the process to convert an interlaced image to a progressively scanned image, the deinterlacing and chroma upsampling are performed using the same motion information. The exemplary embodiment takes the input to the deinterlacer in the 4:2:0 chroma format while the output from the deinterlacer is in the 4:2:2 or 4:4:4 chroma format.

FIG. 1B is a block diagram of the 4:2:0 to 4:2:2 chroma upsampling converter 41 of the present invention in the exemplary embodiment. Block 100 encloses the particular blocks used by the invention. The chroma upsampling process of block 100 takes as its input 2 fields of interlaced 4:2:0 chroma data, 110 and 112, a motion value input, 130, and an optional film flag input, 132. After the deinterlacing process is complete, the image is converted to either an interlaced scanned format, such as the 480i interlaced format, or left in the progressively scanned format, such as the 480p progressive format. Output 182 is a progressive frame of 4:2:2 chroma data. Optional block 190 converts output 182 from progressive 4:2:2 chroma data to interlaced 4:2:2 chroma at output 192.

Block 120 is a motion detector to detect the field to field variations, for example, on a pixel by pixel basis. The cross field motion detector may also operate on the level of groups, blocks, or clusters of pixels, either in a fixed or dynamic arrangement in response to image content, where still areas are treated as a group since such still areas in an interlaced image can be treated as progressive video. There are many different techniques used for detecting motion, such as those from moving target indicator (MTI) technology. The invention is not dependent on any specific technique. The output, 130, from the motion detector is a value indicating the amount of motion for each pixel, group, block, or cluster between 2 or more fields. Smaller values indicate little motion, while larger values indicate greater motion.

Although, for simplicity, this discussion is mainly based on the two distinct cases of either interlaced or progressive signals, there may also be the case where the source video is in interlaced format, but contains still areas in which little or no motion occurs between interlaced fields. These still areas, which would be blocks or groups of pixels, can be treated as progressive and the chroma can be upsampled across both fields. Although the exemplary embodiment of the present invention operates on a pixel by pixel basis, for the upsampling as well as for the inter-field motion detection, and most of the following discussion is for this embodiment, the various functions of the present invention also extend to operating on multi-pixel groups.

Block 122 is an optional film detector. The film detector requires motion value 130, MPEG flags 115, or both. The MPEG flags 115 are decoded from the MPEG stream and include flags such as repeat-first-field, progressive-frame, and progressive-sequence. The film detector analyzes motion value 130 and MPEG flags 115 to determine if the input fields, 110 and 112, were created from a 24 or 30 frames-per-second progressive source, and outputs film flag 132. The motion value 130 is supplied to film detector 122 as the MPEG flags are often not set or set incorrectly.

Block 145 receives the motion value 130 and the optional film flag 132, and then generates an alpha value, denoted "α". Alpha is a value between 0 and 1 inclusive. In the exemplary embodiment, the alpha value varies directly with the motion value 130, with smaller alpha values representing less motion and larger alpha values representing greater motion. For example, the alpha value can be taken as directly proportional to the motion value 130, although more generally it can be a monotonically non-decreasing function of the motion value. Alpha can either be a continuous, smooth function of the motion value or not, for example in an embodiment where $\alpha=0$ if the motion value is zero and $\alpha=1$ otherwise. In other embodiments, the alpha values can vary inversely with motion values, with smaller alpha values representing greater motion and larger values representing less motion. Optionally, if film flag, 132, is present indicating that the input fields, 110 and 112, were created from a progressive source, an alpha value equal to 0 is outputted so that only the progressive converter is used. Block 145 outputs two values, the alpha value, 157, and a value equal to 1 minus alpha, 155.

Block 140 is a progressive 4:2:0 to 4:2:2 chroma converter. Block 140 receives top field interlaced 4:2:0 chroma data, 110, and bottom field interlaced 4:2:0 chroma data, 112. The output, 150, of block 140, is progressive 4:2:2 chroma data converted from interlaced 4:2:0 chroma data using the progressive method. Chroma converter 140 can perform a pixel by pixel conversion or operate on larger groups or blocks of pixels, similarly to the case described above for motion detector 120.

Block 142 is an interlaced 4:2:0 to 4:2:2 chroma converter. Block 142 receives top field interlaced 4:2:0 chroma data, 110, and bottom field interlaced 4:2:0 chroma data, 112. The output, 152, of block 142, is progressive 4:2:2 chroma data converted from interlaced 4:2:0 chroma data using the interlaced method. As with the progressive converter 140, interlaced chroma converter 142 can operate on a pixel by pixel level or use a coarser granularity.

Block 160 is a multiplier that calculates the product of the 4:2:2 chroma data, 150, converted using the progressive method, and the value 1 minus alpha, 155. The output, 170, of block 160, is a weighted value and is inversely proportional to the alpha value. Smaller alpha values represent less motion with the output, 170, containing greater amounts of 4:2:2 chroma data converted using the progressive method. Likewise, larger alpha values represent greater motion with the output, 170, containing fewer amounts of 4:2:2 chroma data converted using the progressive method.

Block 162 is a multiplier that calculates the product of the 4:2:2 chroma data, 152, converted using the interlaced method, and the alpha value, 157. The output, 172, of block 162, is a weighted value and is proportional to the alpha value. Smaller alpha values represent less motion with the output, 172, containing fewer amounts of 4:2:2 chroma data converted using the interlaced method. Likewise, larger alpha values represent greater motion with the output, 172, containing greater amounts of 4:2:2 chroma data converted using the interlaced method.

Block 180 is an adder that calculates the sum of the two weighted progressive 4:2:2 chroma values, 170 and 172, typically on a pixel by pixel basis, although if converters 140 and 142 use a grouping of the pixels, the adder can also operate at this coarser level. The output, 182, of block 180, is a weighted average of the progressive 4:2:2 chroma data converted using the progressive method, 140, and the progressive 4:2:2 chroma data converted data using the interlaced method, 142. Smaller alpha values represent less motion and the output 182 contains a larger weighting of progressive 4:2:2 chroma data converted using the progressive method. Likewise, larger alpha values represent more motion and the output 182 contains a larger weighting of progressive 4:2:2 chroma data converted using the interlaced method.

Optional block 190 is a progressive to interlaced converter which converts the weighted progressive 4:2:2 chroma data, 182, to interlaced 4:2:2 chroma data, 192.

The exemplary embodiment shown of FIG. 1B is shown in a hardware-based implementation, where the invention is embodied in whole or in part within the circuitry of an application specific integrated circuit (ASIC) or a programmable logic device (PLD). In this case, the invention may be embodied in a computer understandable descriptor language that may be used to create an ASIC or PLD that operates as herein described. More generally, the invention also may be embodied in whole or in part in firmware/microcode, software, or some combinations of these. It is well known in the art that logic or digital systems and/or methods can include a wide variety of different components and different functions in a modular fashion. The following will be apparent to those of skill in the art from the teachings provided herein. Different embodiments of the present invention can include different combinations of elements and/or functions. Different embodiments of the present invention can include actions or steps performed in a different order than described in any specific example herein. Different embodiments of the present invention can include groupings of parts or components into larger parts or components different than described in any specific example herein. For purposes of clarity, the invention is described in terms of systems that include many different innovative components and innovative combinations of innovative components and known components. No inference should be taken to limit the invention to combinations containing all of the innovative components listed in any illustrative embodiment in this specification. The functional aspects of the invention, as will be understood from the teachings herein, may be implemented or accomplished using any appropriate implementation environment or programming language, such as C++, Java, JavaScript, etc.

Although most of the following discussion will be based on the exemplary 4:2:0 to 4:2:2 embodiment, the converter 41 of FIG. 1A readily extends to a number of more general embodiments. The most basic generalization would be the extension to a 4:4:4 output, so that the process is both a vertical and horizontal upsampling. This could be implemented by respectively using interlaced and progressive 4:2:0 to 4:4:4 converters for 142 and 140 of FIG. 1B. Alternately, an additional 4:2:2 to 4:4:4 converter could be added to receive output 182 (or 182 and 192) to complete the full upsampling. More general embodiments need not be based on input in the 4:2:0 construct.

A basic aspect of the present invention is that it detects the field to field and/or the frame to frame variations of video data with a downsampled component and upsamples according to a conversion process responsive to the amount of variation: specifically, it forms a weighted sum of an interlaced conversion and a progressive conversion, where the weighting factor is a function of the amount of variation. Although the top field/bottom field format is the most common construct for the decomposition of a frame, the frame can be broken down in other ways. For example, a vertical or diagonal decomposition could be used and a frame could be composed of another number of fields besides two. When a diagonal or other non-horizontal decomposition is used, "vertical upsampling" should be interpreted to mean an upsampling in a directional perpendicular to the decomposition into fields. Further, although it is standard for the downsampled portion of the input signal to be the chroma, in the more general case the downsampled portion can be any of the input signal's components or the signal as a whole. For example, there may be applications, such as those related to high definition television (HDTV), that have the luma component downsampled.

In all of these cases, the different fields would again be provided to the motion detector 120, progressive converter 140, and interlaced converter 142. The converters 140 and 142 would then be appropriate to the chosen input and output formats. The motion detector 120 would again detect the cross-field variations, as it is these temporal characteristics that determine the motion value and, through alpha, the relative weighting of the progressive upsampling 150 and the interlaced upsampling 152. The motion detector can compare the fields of only the downsampled components, such as the chroma in the exemplary embodiment, or other components, such as luma, in addition to or instead of the downsampled component. Additionally, in the more general case, the input 115 to the film detector 122 that indicates whether the source is progressive would be replaced by the control signals appropriate to the particular constructs used instead of the specific MPEG flags of FIG. 1B.

Returning to the exemplary embodiment, FIG. 2 is a diagram depicting 4:4:4 YCbCr video sampling. In this uncompressed format, for every luma sample, there is a pair of chroma (Cb and Cr) samples. The chroma samples are co-sited with every luma sample.

FIG. 3 is a diagram depicting 4:2:2 YCbCr video sampling. Compared to 4:4:4 video sampling, 4:2:2 chroma is horizontally downsampled and contains half as many chroma samples. The chroma pairs are co-sited with every other luma sample.

Were a vertical downsampling technique used, in a 4:2:2 sampling there would still be half as many chroma samples as there are luma samples, but the co-sited chroma samples would be placed on the entire line of every other line, basically looking like FIG. 3 rotated by a quarter turn. Similarly, in a diagonal downsampling technique, the co-sited chroma would be formed on every other diagonal line. Although the following discussion is mainly based on horizontal YCbCr video sampling techniques, these other downsamplings can be similarly extended to the non-horizontal case.

FIG. 4A is a diagram depicting type-1 4:2:0 YCbCr video sampling typically used in MPEG2. Chroma samples are downsampled both vertically and horizontally. Compared to 4:4:4 video sampling, 4:2:0 contains one quarter as many chroma samples. Compared to 4:2:2 video sampling, 4:2:0 contains half as many chroma samples. Chroma samples are co-sited horizontally with luma samples and vertically sited interstitially between luma samples.

FIG. 4B is a diagram depicting type-2 4:2:0 YCbCr video sampling typically used in MPEG1. Type-2 differs from Type-1 in that chroma samples are also horizontally sited interstitially between luma samples. The methods used to vertically upsample type-2 4:2:0 chroma are identical to the methods used to vertically upsample Type-1 4:2:0 chroma.

FIG. 5A is a diagram depicting Type-3 4:2:0 YCbCr video sampling typically used in JPEG 2000. Type-3 differs from Type-1 in that chroma samples are also vertically co-sited with every other luma sample.

FIG. 5B is a diagram depicting Type-4 4:2:0 YCbCr video sampling. Type-4 differs from Type-3 in that chroma samples are horizontally sited interstitially between luma samples. The methods used to vertically upsample Type-4 4:2:0 chroma are identical to the methods used to vertically upsample Type-3 4:2:0 chroma.

FIG. 6A depicts a typical progressive Type-1 4:2:0 to 4:2:2 chroma upsampling method. Many methods exist, including nearest neighbor replication, linear interpolation, and multi-tap interpolation. The invention does not depend upon any specific progressive 4:2:0 to 4:2:2 chroma upsampling method. The exemplary embodiment of the invention uses a 2-tap variable linear filter as depicted in FIG. 6A. For each line of 4:2:0 chroma, 2 lines of 4:2:2 chroma data must be generated. Using $C_{420}$ to denote the 4:2:0 chroma input data, $C_{422}$ to denote the 4:2:2 chroma output data, the notations i−1, i and i+1 to describe the $C_{420}$ input values at locations 610, 612 and 614 respectively, and the notations 2i and 2i+1 to describe the $C_{422}$ values at locations 620 and 622 respectively, a set of equations can then be formulated to generate $C_{422}(2i)$ and $C_{422}(2i+1)$ from $C_{420}(i-1)$, $C_{420}(i)$ and $C_{420}(i+1)$. Assigning a value of 1 to the vertical distance between $C_{420}$ samples, the vertical distance between $C_{422}(2i)$ and $C_{420}(i-1)$ is ¾ and between $C_{422}$ (2$i$) and $C_{420}$(i) is ¼. Similarly, the vertical distance between $C_{422}$ (2$i$+1) and $C_{420}$(i) is ¼ and between $C_{422}$(2$i$+1) and $C_{420}$ (i+1) is ¾. As is apparent to those skilled in the art, the weighting factors are often selected to be inversely proportional to the distance, resulting in the following two equations:

$$C_{422}(2i) = \frac{1}{4}C_{420}(i-1) + \frac{3}{4}C_{420}(i)$$

$$C_{422}(2i+1) = \frac{3}{4}C_{420}(i) + \frac{1}{4}C_{420}(i+1)$$

FIG. 6B depicts a typical top-field interlaced Type-1 4:2:0 to 4:2:2 chroma upsampling method. Many methods exist, including nearest neighbor replication, linear interpolation, and multi-tap interpolation. The invention does not depend upon any specific top-field interlaced 4:2:0 to 4:2:2 chroma upsampling method. The exemplary embodiment of the invention uses a 2-tap variable linear filter as depicted in FIG. 6B. For each line of 4:2:0 chroma, 4 lines of 4:2:2 chroma data must be generated. Using $C_{420}$ to denote the 4:2:0 chroma input data, $C_{422}$ to denote the 4:2:2 chroma output data, the notations i−1, i and i+1 to describe the $C_{420}$ input values at locations 640, 642 and 644 respectively, and the notations 4$i$, 4$i$+1, 4$i$+2 and 4$i$+3 to describe the $C_{422}$ values at locations 650, 652, 654 and 656 respectively, a set of equations can then be formulated to generate $C_{422}(4i)$, $C_{422}(4i+1)$, $C_{422}(4i+2)$ and $C_{422}(4i+3)$ from $C_{420}(i-1)$, $C_{420}(i)$ and $C_{420}(i+1)$. Assigning a value of 1 to the vertical distance between $C_{420}$ samples, the vertical distance between $C_{422}(4i)$ and $C_{420}(i-1)$ is ⅞ and between $C_{422}(4i)$ and $C_{420}(i)$ is ⅛. Similarly, the vertical distance between $C_{422}(4i+1)$ and $C_{420}(i)$ is ⅛ and between $C_{422}(4i+1)$ and $C_{420}(i+1)$ is ⅞. Likewise, the vertical distance between $C_{422}(4i+2)$ and $C_{420}(i)$ is ⅜ and between $C_{422}$ (4$i$+2) and $C_{420}(i+1)$ is ⅝. Furthermore, the vertical distance between $C_{422}$ (4$i$+3) and $C_{420}$ (i) is/and between $C_{422}$ (4$i$+3) and $C_{420}(i+1)$ is ⅜. As apparent to those skilled in the art, the weighting factors are often selected to be inversely proportional to the distance, resulting in the following four equations:

$$C_{422}(4i) = \frac{1}{8}C_{420}(i-1) + \frac{7}{8}C_{420}(i)$$

$$C_{422}(4i+1) = \frac{7}{8}C_{420}(i) + \frac{1}{8}C_{420}(i+1)$$

$$C_{422}(4i+2) = \frac{5}{8}C_{420}(i) + \frac{3}{8}C_{420}(i+1)$$

$$C_{422}(4i+3) = \frac{3}{8}C_{420}(i) + \frac{5}{8}C_{420}(i+1)$$

FIG. 6C depicts a typical bottom-field interlaced Type-1 4:2:0 to 4:2:2 chroma upsampling method. Many methods exist, including nearest neighbor replication, linear interpolation, and multi-tap interpolation. The invention does not depend upon any specific bottom-field interlaced 4:2:0 to 4:2:2 chroma upsampling method. The exemplary embodiment of the invention uses a 2-tap variable linear filter as depicted in FIG. 6C. For each line of 4:2:0 chroma, 4 lines of 4:2:2 chroma data must be generated. Using $C_{420}$ to denote the 4:2:0 chroma input data, $C_{422}$ to denote the 4:2:2 chroma output data, the notations i−1, i and i+1 to describe the $C_{420}$ input values at locations 670, 672 and 674 respectively, and the notations 4$i$, 4$i$+1, 4$i$+2 and 4$i$+3 to describe the $C_{422}$ values at locations 680, 682, 684 and 686 respectively, a set of equations can then be formulated to generate $C_{422}$ (4$i$), $C_{422}$ (4$i$+1), $C_{422}$ (4$i$+2) and $C_{422}$ (4$i$+3) from $C_{420}(i-1)$, $C_{420}(i)$ and $C_{420}(i+1)$. Assigning a value of 1 to the vertical distance between $C_{420}$ samples, the vertical distance between $C_{422}(4i)$ and $C_{420}(i-1)$ is ⅜ and between $C_{422}(4i)$ and $C_{420}(i)$ is ⅝. Similarly, the vertical distance between $C_{422}$ (4$i$+1) and $C_{420}$ (i−1) is ⅝ and between $C_{422}(4i+1)$ and $C_{420}(i)$ is ⅜. Likewise, the vertical distance between $C_{422}(4i+2)$ and $C_{420}(i-1)$ is ⅞ and between $C_{422}(4i+2)$ and $C_{420}(i)$ is ⅛. Furthermore, the vertical distance between $C_{422}(4i+3)$ and $C_{420}(i)$ is ⅛ and between $C_{422}$ (4$i$+3) and $C_{420}$ (i+1) is ⅞. As apparent to those skilled in the art, the weighting factors are often selected to be inversely proportional to the distance, resulting in the following four equations:

$$C_{422}(4i) = \frac{5}{8}C_{420}(i-1) + \frac{3}{8}C_{420}(i)$$

$$C_{422}(4i+1) = \frac{3}{8}C_{420}(i-1) + \frac{5}{8}C_{420}(i)$$

$$C_{422}(4i+2) = \frac{1}{8}C_{420}(i-1) + \frac{7}{8}C_{420}(i)$$

$$C_{422}(4i+3) = \frac{7}{8}C_{420}(i) + \frac{5}{8}C_{420}(i+1)$$

FIG. 7A depicts a typical progressive Type-3 4:2:0 to 4:2:2 chroma upsampling method. Many methods exist, including nearest neighbor replication, linear interpolation, and multi-tap interpolation. The invention does not depend upon any specific progressive 4:2:0 to 4:2:2 chroma upsampling method. The exemplary embodiment of the invention uses a 2-tap variable linear filter as depicted in FIG. 7A. For each line of 4:2:0 chroma, 2 lines of 4:2:2 chroma data must be generated. Using $C_{420}$ to denote the 4:2:0 chroma input data, $C_{422}$ to the 4:2:2 chroma output data, the notations i and i+1 to describe the $C_{420}$ input values at locations 712 and 714 respectively, and the notations 2$i$ and 2$i$+1 to describe the C422 values at locations 712 and 722 respectively, a set of equations can then be formulated to generate $C_{422}(2i)$ and $C_{422}$ (2$i$+1) from $C_{420}$ (i) and $C_{420}$ (i+1). Since Type-3, 4:2:0 chroma samples are vertically co-sited; with the luma samples, $C_{422}(2i)$ is equal to $C_{422}(2i)$ Assigning a value of 1 to the vertical distance between $C_{420}$ samples, the vertical distance between $C_{422}(2i+1)$ and $C_{420}(i)$ is ½ and between $C_{422}(2i+1)$ and $C_{422}(i+1)$ is also ½. As apparent to those skilled in the art, the following two equations result:

$$C_{422}(2i) = C_{420}(i)$$

$$C_{422}(2i+1) = \frac{1}{2}C_{420}(i) + \frac{1}{2}C_{420}(i+1)$$

FIG. 7B depicts a typical top-field interlaced Type-3 4:2:0 to 4:2:2 chroma unsampling method. Many methods exist, including nearest neighbor replication, linear interpolation, and multi-tap interpolation. The invention does not depend upon any specific top-field interlaced 4:2:0 to 4:2:2 chroma upsampling method. The exemplary embodiment of the invention uses a 2-tap variable linear filter as depicted in FIG. 7B. For each line of 4:2:0 chroma, 4 lines of 4:2:2 chroma data must be generated. Using $C_{420}$ to denote the 4:2:0 chroma input data, $C_{422}$ to denote the 4:2:2 chroma output data, the notations i and i+1 to describe the $C_{420}$ input values at locations 742 and 744 respectively, and the notations 4$i$, 4$i$+2 and 4$i$+3 to describe the $C_{422}$ values at locations 742, 752, 754, and 756 respectively, a set of equations can then be formulated to generate $C_{422}(4i)$, $C_{422}(4i+1)$, $C_{422}(4i+2)$ and $C_{422}(4i+3)$ from $C_{420}(i)$ and $C_{422}(i+1)$. Since Type-3 4:2:0 chroma samples are vertically co-sited with the luma samples, $C_{422}(4i)$ is equal to $C_{422}(4i)$. Assigning a value of 1 to the vertical distance between $C_{422}$ samples, the vertical distance between $C_{422}(4i+1)$ and $C_{420}(i)$ is ¼ and between $C_{422}(4i+1)$ and $C_{422}(i+1)$ is ¾. Similarly, the vertical distance between $C_{422}(4i+2)$ and $C_{422}(i)$ is ½ and between $C_{422}(4i+2)$ and $C_{420}(i+1)$ is also ½. Likewise, the vertical distance between $C_{422}(4i+3)$ and $C_{420}(i)$ is ¾ and between $C_{422}(4i+3)$ and $C_{422}(i+1)$ is ¼. As apparent the those skilled in the art, the weighting factors are often selected to be inversely proportional to the distance, resulting in the following four equations:

$$C_{422}(4i) = C_{420}(i)$$

$$C_{422}(4i+1) = \frac{3}{4}C_{420}(i) + \frac{1}{4}C_{420}(i+1)$$

$$C_{422}(4i+2) = \frac{1}{2}C_{420}(i) + \frac{1}{2}C_{420}(i+1)$$

$$C_{422}(4i+3) = \frac{1}{4}C_{420}(i) + \frac{3}{4}C_{420}(i+1)$$

FIG. 7C depicts a typical bottom-field interlaced Type-3 4:2:0 to 4:2:2 chroma unsampling method. Many methods exist, including nearest neighbor replication, linear interpolation, and multi tap interpolation. The invention does not depend upon any specific bottom-field interlaced 4:2:0 to 4:2:2 chroma upsampling method. The current embodiment of the invention uses a 2-tap variable linear filter as depicted in FIG. 7C. For each line of 4:2:0 chroma, 4 lines of 4:2:2 chroma data must be generated. Using $C_{420}$ to denote the 4:2:0 chroma input data, $C_{422}$ to denote the 4:2:2 chroma output data, the notations i−1, i and i+1 to describe the $C_{420}$ input values at locations 770, 772 and 774 respectively, and the notations 4i, 4i+1, 4i+2 and 4i+3 to describe the C422 values at locations 780, 782, 772 and 786 respectively, a set of equations can then be formulated to generate $C_{422}(4i)$, $C_{422}(4i+1)$, $C_{422}(4i+2)$ and $C_{422}(4i+3)$ from $C_{420}(i-1)$, $C_{420}(i)$ and $C_{420}(i+1)$. Assigning a value of 1 to the vertical distance between $C_{420}$ samples, the vertical distance between $C_{422}(4i)$ and $C_{420}(i-1)$ is ½ and between $C_{422}(4i)$ and $C_{420}(i)$ is also ½. Similarly, the vertical distance between $C_{422}(4i+1)$ and $C_{420}(i-1)$ is ¾ and between $C_{422}(4i+1)$ and $C_{420}(i)$ is ¼. Since Type-3 4:2:0 chroma samples are vertically co-sited with the luma samples, $C_{422}(4i+2)$ is equal to $C_{420}(i)$. Furthermore, the vertical distance between $C_{422}(4i+3)$ and $C_{420}(i)$ is ¼ and between $C_{422}(4i+3)$ and $C_{420}(i+1)$ is ¾. As apparent to those skilled in the art, the weighting factors are often selected to be inversely proportional to the distance, resulting in the following four equations:

$$C_{422}(4i) = \frac{1}{2}C_{420}(i-1) + \frac{1}{2}C_{420}(i)$$

$$C_{422}(4i+1) = \frac{1}{4}C_{420}(i-1) + \frac{3}{4}C_{420}(i)$$

$$C_{422}(4i+2) = C_{420}(i)$$

$$C_{422}(4i+3) = \frac{3}{4}C_{420}(i) + \frac{1}{4}C_{420}(i+1)$$

Although various aspects of the present invention have been described with respect to specific embodiments, it will be understood that the invention is protected within the full scope of the appended claims.

It is claimed:

1. A method of upsampling video data, comprising:
   receiving video data including a downsampled component; and
   upsampling the downsampled component, wherein the conversion process used for said upsampling is responsive to the characteristics of the downsampled component, wherein said video data comprises a plurality of fields and said characteristics of the downsampled component to which the conversion is responsive includes the relative motion between a plurality of said fields of the video data, and
   wherein said conversion process is a weighted sum of an interlaced conversion and a progressive conversion and the relative weights of the interlaced and progressive conversion in the sum is responsive to said characteristics of the downsampled component.

2. The method of claim 1, wherein said upsampling is performed on a pixel by pixel basis.

3. The method of claim 1, wherein said upsampling includes upsampling performed on multi-pixel groups.

4. The method of claim 1, further comprising:
   determining relative motion between a plurality of said fields of the video data.

5. The method of claim 4, wherein said relative motion is determined on a pixel by pixel basis.

6. The method of claim 4, wherein said determining relative motion includes a determination on a multi-pixel group basis.

7. The method of claim 1, wherein said video data is in luma-chroma format and the downsampled component is the chroma.

8. The method of claim 7, wherein said upsampling is a 4:2:0 to 4:2:2 conversion.

9. A method, comprising:
   receiving video signal data having a downsampled component;
   comparing fields of the downsampled component to determine the relative difference between a plurality of the fields, wherein said relative difference is the pixel motion between 2 or more of said fields of the downsampled component;
   upsampling the video signal data, wherein said upsampling is responsive to said relative difference, wherein said upsampling of the video signal data includes:
      performing a progressive upsampling of the video signal data;
      performing an interlaced upsampling of the video signal data; and
      forming a weighted sum of the progressive upsampling and the interlaced upsampling, wherein the relative weights of the progressive upsampling and the interlaced upsampling in the sum is dependent upon said relative difference between the plurality of the fields.

10. The method of claim 9, wherein said relative difference includes the motion of multi-pixel groups between 2 or more of said fields of the downsampled component.

11. The method of claim 9, wherein said upsampling is further responsive to field, frame and progressive sequence constructs of the video signal data.

12. The method of claim 9, wherein said video signal data is encoded in a luma-chroma format and the downsampled component is the chroma data.

13. The method of claim 9, wherein said video signal data is received in the form of fields.

14. The method of claim 9, wherein said upsampling is performed on a pixel by pixel basis.

15. The method of claim 9, wherein said upsampling includes upsampling performed on multi-pixel groups.

16. A device for upsampling a video data signal containing a downsampled component and received as a plurality of fields, comprising:

comparison circuitry to receive said downsampled component and determine field to field variations thereof; and upsampling circuitry connected to said comparison circuitry and to receive said video data signal, wherein said upsampling circuitry upsamples said video data signal in a process responsive to said field to field variations, wherein said comparison circuitry comprises:

a motion detector to generate a value indicative of said field to field variations; and a parameter generator connected to said motion detector and to supply a parameter derived from the value indicative of said field to field variations to said upsampling circuitry, said parameter being a continuous function of the value indicative of said field to field variations; and wherein said upsampling circuitry comprises:

an interlaced converter;

a progressive converter; and summing circuitry connected to receive the parameter, wherein the summing circuitry forms a sum of the outputs of the interlaced converter and the progressive converter weighted according to said parameter.

17. The device of claim 16, wherein said comparison circuitry comprises:

detection circuitry connected to receive control signals in said video data signal and connected to supply information derived from said control signals to the parameter generator, wherein said parameter is further derived from said information derived from said control signals.

18. The device of claim 16, wherein said interlaced converter and progressive converter are 4:2:0 to 4:2:2 converters.

19. The device of claim 16, wherein the outputs of the interlaced converter and the progressive converter are in progressive form, the device further comprising:

a progressive to interlaced converter connected to the summing circuitry to convert said sum to interlaced form.

20. The device of claim 16, wherein said video data signal is in the luma-chroma format and said downsampled component is the chroma component.

21. The device of claim 20, wherein said video data signal is received in 4:2:0 form and upsampled to 4:2:2 form.

\* \* \* \* \*

UNITED STATES PATENT AND TRADEMARK OFFICE
CERTIFICATE OF CORRECTION

PATENT NO. : 7,474,355 B2
APPLICATION NO. : 10/636462
DATED : January 6, 2009
INVENTOR(S) : Leone et al.

It is certified that error appears in the above-identified patent and that said Letters Patent is hereby corrected as shown below:

Column 11, line 37, please delete "is/and" and replace with -- is 5/8 and --.

Column 12, line 5, please delete "1/8" and replace with -- 5/8 --.

Column 12, line 39, please delete "C422" and replace with -- $C_{422}$ --.

Column 12, line 43, please delete "is equal to $C_{422}(2i)$" and replace with -- is equal to $C_{420}(2i)$ --.

Column 12, line 46, please delete "$C_{422}(i+1)$" and replace with -- $C_{420}(i+1)$ --.

Column 12, line 66, after "$4i$", please add -- $4i+1$, --.

Column 13, line 3, please delete "$C_{422}(i+1)$" and replace with -- $C_{420}(i+1)$ --.

Column 13, line 5, please delete "$C_{422}(4i)$" and replace with -- $C_{420}(4i)$ --.

Column 13, line 6, please delete "$C_{422}$" and replace with -- $C_{420}$ --.

Column 13, line 8, please delete "$C_{422}(i+1)$" and replace with -- $C_{420}(i+1)$ --.

Column 13, line 9, please delete "$C_{422}(i)$" and replace with -- $C_{420}(i)$ --.

Column 13, line 11, please delete "$C_{422}(i+1)$" and replace with -- $C_{420}(i+1)$ --.

UNITED STATES PATENT AND TRADEMARK OFFICE
CERTIFICATE OF CORRECTION

PATENT NO. : 7,474,355 B2
APPLICATION NO. : 10/636462
DATED : January 6, 2009
INVENTOR(S) : Leone et al.

It is certified that error appears in the above-identified patent and that said Letters Patent is hereby corrected as shown below:

Column 13, line 39, please delete "C422" and replace with -- $C_{422}$ --.

Signed and Sealed this

Tenth Day of March, 2009

JOHN DOLL
*Acting Director of the United States Patent and Trademark Office*